United States Patent
Chen

(10) Patent No.: US 12,341,150 B2
(45) Date of Patent: Jun. 24, 2025

(54) QUASI-SOLID-STATE ELECTROLYTE COMPOSITE BASED ON THREE-DIMENSIONALLY ORDERED MACROPOROUS METAL-ORGANIC FRAMEWORK MATERIALS FOR LITHIUM SECONDARY BATTERY AND METHOD FOR MANUFACTURING THE SAME

(71) Applicant: SOLID ULTRABATTERY INC., Waterloo (CA)

(72) Inventor: Zhongwei Chen, Zhejiang (CN)

(73) Assignee: SOLID ULTRABATTERY INC., Waterloo (CA)

( * ) Notice: Subject to any disclaimer, the term of this patent is extended or adjusted under 35 U.S.C. 154(b) by 858 days.

(21) Appl. No.: 17/441,615

(22) PCT Filed: Mar. 22, 2020

(86) PCT No.: PCT/CN2020/080538
§ 371 (c)(1),
(2) Date: Sep. 21, 2021

(87) PCT Pub. No.: WO2020/192601
PCT Pub. Date: Oct. 1, 2020

(65) Prior Publication Data
US 2022/0158221 A1    May 19, 2022

Related U.S. Application Data

(60) Provisional application No. 62/822,311, filed on Mar. 22, 2019.

(51) Int. Cl.
*H01M 10/056*    (2010.01)

(52) U.S. Cl.
CPC .. *H01M 10/056* (2013.01); *H01M 2300/0091* (2013.01)

(58) Field of Classification Search
None
See application file for complete search history.

(56) References Cited

U.S. PATENT DOCUMENTS

2012/0077092 A1* 3/2012 Lee ..................... H01B 1/122
                                                        429/317
2018/0375158 A1* 12/2018 Morinaka ............... H01M 6/16

FOREIGN PATENT DOCUMENTS

CN      102738510 A      10/2012
CN      103474696 A      12/2013
(Continued)

OTHER PUBLICATIONS

Shen et al., "Ordered macro-microporous metal-organic framework single crystals," Science, 359, 206-210 (2018), Jan. 12, 2018. (Year: 2018).*

(Continued)

*Primary Examiner* — Amanda J Barrow
(74) *Attorney, Agent, or Firm* — PERRY + CURRIER INC.

(57) ABSTRACT

A three-dimensionally ordered macroporous (3DOM) metal-organic framework material (MOF)-based quasi-solid-state electrolyte thin film for a safe quasi-solid-state lithium secondary battery are provided by the present invention. In detail, the above quasi-solid-state electrolyte combines 3DOM-MOFs and the electrolytes like polymer and traditional liquid electrolyte. The special pore structures in 3DOM-MOFs could both fill the polymer electrolyte and liquid electrolyte with macropores and micropores, respectively. This unique structure could significantly enhance the Li+ conductivity rate through the different kinds of electrolytes in the corresponding pore structures as well as improve the battery performance. More importantly, this quasi-solid-state electrolyte is much safer than the traditional organic (Continued)

electrolyte. It should be easy to scale-up since the procedures are simple.

14 Claims, 3 Drawing Sheets

(56) References Cited

FOREIGN PATENT DOCUMENTS

| | | | | |
|---|---|---|---|---|
| CN | 105070946 A | * | 11/2015 | ........ H01M 10/0565 |
| CN | 107946636 A | * | 4/2018 | ........ H01M 10/0525 |

OTHER PUBLICATIONS

Tong, Zhongqiu, et al. "Improved electrochromic performance and lithium diffusion coefficient in three-dimensionally ordered macroporous $V_2O_5$ films." Journal of Materials Chemistry C 2.18 (2014): 3651-3658.

Hara, Masanori, et al. "Fabrication of all solid-state lithium-ion batteries with three-dimensionally ordered composite electrode consisting of $Li0.35La0.55TiO_3$ and $LiMn_2O_4$." Journal of Power Sources 189.1 (2009): 485-489.

He, Hongming, et al. "A Stable Metal—Organic Framework Featuring a Local Buffer Environment for Carbon Dioxide Fixation." Angewandte Chemie 130.17 (2018): 4747-4752.

* cited by examiner

QUASI-SOLID-STATE ELECTROLYTE COMPOSITE BASED ON THREE-DIMENSIONALLY ORDERED MACROPOROUS METAL-ORGANIC FRAMEWORK MATERIALS FOR LITHIUM SECONDARY BATTERY AND METHOD FOR MANUFACTURING THE SAME

FIELD OF THE INVENTION

The present invention relates to quasi-solid-state electrolyte composite materials and quasi-solid-state secondary lithium (Li) batteries, and specifically, a solid electrolyte thin film composed of three-dimensionally ordered macroporous metal-organic framework materials, polymers and liquid electrolyte.

BACKGROUND OF THE INVENTION

Traditional lithium batteries usually employ the liquid organic electrolytes, and thus have safety issues, like flammability, liquid leakage, and short circuit temperature rise.

The commercialization process of rechargeable batteries is hence delayed. To this end, the development of safe and reliable electrolytes is a great challenge.

Among the above novel electrolytes, all-solid-state electrolytes are attracting more and more interest in recent years because of safety. However, all-solid-state electrolytes have poor interfacial structure between the electrodes and the electrolyte, and low ionic conductivity at room temperature.

Quasi-solid-state electrolytes are a better approach because they apply a little bit of liquid electrolyte, and thus improve safety due to the inflammability and non-leakage. Furthermore, quasi-solid-state electrolytes could be easily assembled with positive and negative electrodes to obtain a higher capacity. However, designing a quasi-solid-state electrolyte with high-performance is challenging.

In the above described quasi-solid-state-electrolytes, the formation of electrolyte materials containing a polymer and a liquid electrolyte has been proposed. For example, United States Patent Publication No. 20170179545A1 describes a quasi-solid-state lithium battery with high thermal stability containing a sulfide solid electrolyte material.

Furthermore, United States Patent Publication No. 20170084949A1 describes a quasi-solid-state electrolyte that has a well-balanced combination of contact performance with electrode active materials, conductivity, and chemical and structural stability, each at a high level, and an all solid-state lithium secondary battery using the quasi-solid-state electrolyte. In addition, Chinese Patent Publication No. 101013766A describes a quasi-solid-state-electrolyte containing ionic liquid and inorganic layer materials. Chinese Patent Publication No. 101752090A describes a quasi-solid-state electrolyte using polyionic liquid and polyvinylidene fluoride.

SUMMARY OF THE INVENTION

The purpose of the present invention is to overcome the defects in existing battery electrolytes, thereby providing a quasi-solid electrolyte material based on a three-dimensional ordered macroporous (3DOM) metal-organic framework (MOF) channel compounded with a small amount of a liquid electrolyte and a polymer electrolyte; a manufacturing process therefor; and uses of the material in lithium ion batteries and lithium sulfur batteries. The solid electrolyte material based on the three-dimensional ordered macroporous metal-organic framework material has excellent stability and safety in lithium-ion batteries and lithium sulfur batteries, and the manufacturing process has highly reproducible steps, which is suitable for industrial production.

Certain technical problems are solved by adopting the following technical solutions. A quasi-solid electrolyte for a lithium battery based on a three-dimensional ordered macroporous metal-organic framework material cell composite, according to the present invention, comprises a metal-organic framework material, a polymer electrolyte material, a liquid electrolyte, and a lithium salt. The metal-organic framework material, polymer electrolyte material, liquid electrolyte, and lithium salt, are described herein in terms of weight percentage: the percentage of the three-dimensional ordered macroporous metal-organic framework material is 10% to 70%, and preferably 15% to 60%; the percentage of the polymer electrolyte material is 5% to 80%, and preferably 20% to 80%; the percentage of the liquid electrolyte is 0.01% to 1%, and preferably 0.5% to 1%; and the percentage of the lithium salt is 5% to 19%, and preferably 8% to 19%.

In one preferable example, the three-dimensional ordered macroporous metal-organic framework materials are selected from one or more of 3DOM-PCN-601, 3DOM-ZIF-8, 3DOM-ZIF-67, 3DOM-ZIF-68, 3DOM-ZIF-69, 3DOM-ZIF-70, 3DOM-ZIF-78, 3DOM-ZIF-81, 3DOM-ZIF-82, 3DOM-ZIF-95, 3DOM-ZIF-100, [{Fe$_3$($\mu_3$—O)(bdc)$_3$}$_4${Co$_2$(na)$_4$(LT)$_2$}$_3$], and JUC-1000.

In one preferable example, the polymer electrolyte material is selected from one or more of a polyethylene oxide group, a polymethyl methacrylate group, a polyacrylonitrile group, a polyvinylidene fluoride, a polyvinylidene fluoride, and a copolymer of hexafluoropropylene.

In one preferable example, the polymer electrolyte materials are selected from polyethylene oxide groups, or copolymerization of polyethylene oxide groups with polymethyl methacrylate groups, polyacrylonitrile groups, polyvinylidene fluoride, polyvinylidene fluoride, and hexafluoropropylene.

In one preferable example, the liquid electrolyte is selected from one or more of tetraethylene glycol dimethyl ether, ethylene glycol dimethyl ether, diethylene glycol dimethyl ether, tetraethanol dimethyl ether, 1,3-dioxolane, tetrahydrofuran, and methyl ethyl sulfone.

In one preferable example, the liquid electrolyte is one or two selected from the group consisting of tetraethylene glycol dimethyl ether, ethylene glycol dimethyl ether, diethylene glycol dimethyl ether, tetraethanol dimethyl ether, 1,3-dioxolane, tetrahydrofuran, and methyl ethyl sulfone.

In one preferable example, the lithium salt is selected from one or more of LiPF$_6$, LiBF$_4$, LiClO$_4$, LiAsF$_6$, LiBOB, LiODFB, LiCF$_3$SO3, and LiN(SO$_2$CF$_3$)$_2$.

The object of the present invention and its technical problems are also achieved by adopting the following technical solutions. A method for preparing a quasi-solid electrolyte for a lithium battery based on a three-dimensional ordered macroporous metal-organic framework material channel composite as claimed in the present invention. The method includes the following steps:
  (a) preparing three-dimensional ordered macroporous metal-organic framework materials;
  (b) uniformly mixing the three-dimensional ordered macroporous metal-organic framework material prepared in the above step (a) with a polymer electrolyte material and a lithium salt according to a certain ratio, and then pressing into a film;
  (c) immersing the film obtained in the above step (b) in a liquid electrolyte and then drying the film to obtain a lithium battery quasi-solid electrolyte based on a three-dimensional ordered macroporous metal-organic frame material channel composite.

With the above technical solution, the present invention has at least the following advantages:

(1) The three-dimensional ordered macroporous metal-organic framework material of the present invention, that is, 3DOM-MOFs, is a material having a three-dimensional structure, which has both large and small pores, and the channels are uniformly distributed and oriented, orderly, regular and so on.

(2) In the three-dimensional ordered macroporous metal-organic framework material of the present invention, a polymer electrolyte material can be compounded into the macropores, a small amount of a conventional liquid electrolyte can be compounded into the small holes, and a quasi-solid electrolyte material is obtained after being pressed into a film. No liquid electrolyte leaks, which greatly reduces the content of flammable electrolyte, and can significantly reduce the safety risk of battery electrolytes.

(3) The quasi-solid electrolyte based on the 3DOM-MOF composite of the present invention has a high ion conduction rate between the electrolyte and the polymer electrolyte in the components, which can significantly enhance the Li+ conduction rate, thereby improving performance in lithium-ion batteries and lithium sulfur batteries.

(4) The preparation method of the present invention has simple steps, is highly reproducible, and is suitable for industrial production.

In summary, the special quasi-solid electrolyte material provides excellent performance, and its preparation method provide is more suitable for practical use and has industrial value. It has many of the above-described advantages and practical values, and it is indeed an innovation without similar publication or use in similar preparation methods. It is a great improvement both in preparation method and function. Technically, it has made great progress and produced good and practical effects, and has a number of improved functions over the existing electrolyte materials and their preparation methods, so it is more suitable for practical use, and has extensive industrial value.

The above description is only an overview of the technical solution of the present invention. In order to understand the technical means of the present invention more clearly, the following detailed description, drawings, and preferred embodiments of the present invention are provided.

The specific preparation method and structure of the present invention are given in detail by the following examples.

DETAILED DESCRIPTION OF THE PREFERRED EMBODIMENT

Figure 1:
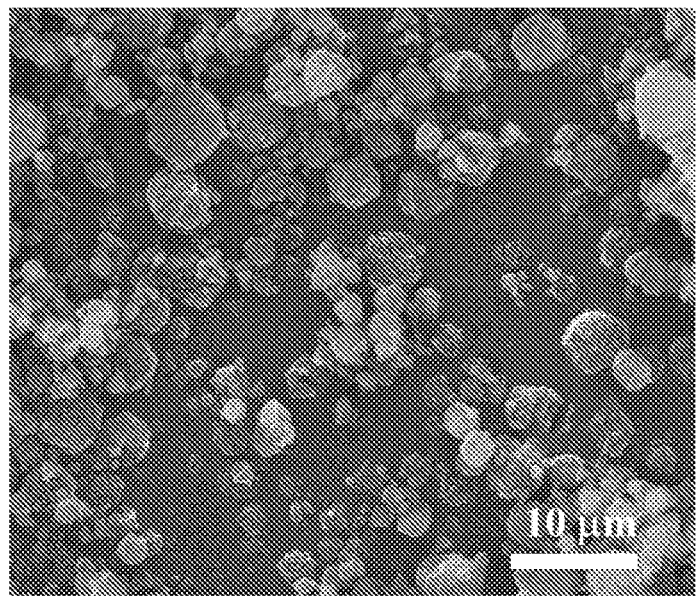
FIG. 1 is the SEM image of 3DOM-ZIF-67-PEO-LiPF$_6$/LiBOB, according to Example 1.

Hereinafter, the present invention will be described in more detail with reference to the examples. Meanwhile, the present invention is not interpreted to be limited thereto.

Example 1

I. Production of Quasi-Solid-State Electrolyte

The PS/H$_2$O solution is centrifuged with a rotation rate of 4000 r/h for 6 hours, and the top clear solution is poured out. The precipitation sample is dried at 90° C. for one night to obtain the ordered PS template. The above PS template is immersed into a cobalt nitrate/methanol solution with a concentration of 0.05 g/mL for 2 hours. Then the solution is removed, and the PS template is dried at 90° C. for one night. The above sample is immersed into a 2-methylimidazole/methanol solution with a concentration of 0.1 g/mL for 48 hours to obtain a PS/ZIF-67 composite. The PS/ZIF-67 composite is immersed in DMF and stirred for 24 hours to remove PS and get the 3DOM-ZIF-67.6 mg of 3DOM-ZIF-67, and 2 mg of PEO are weighed. 0.75 g of LiPF$_6$ and 0.75 g of LiBOB are weighed. The four samples are stirred well and then formed into a film using a preforming machine.

II. Electrochemical Characterization of the Quasi-Solid-State Electrolyte

The ion conductivity was tested at different temperatures.

III. Production of Li—S all-Solid-State Battery

The electrolyte was then immersed in a 70% S/CS$_2$ solution at 155° C. for 6 h to obtain carbonaceous fabrics, which were mixed with carbon black (wt. 10%) and PVDF (10%) as the cathode material. A Li—S battery was assembled with lithium (Li) metal and a commercially available Celgard 2500 separator. The battery performance was then tested at room temperature.

IV. Production of Li-Ion all-Solid-State Battery

A Li-ion battery is assembled with commercially available Nickel Cobalt Manganese (NCM523) as the ternary cathode material, and graphite as the negative electrode. The obtained all-solid-state material is used as the electrolyte. The cell is assembled and tested under open air conditions.

Example 2

In Example 2, the weight percentage of 3DOM-MOFs in the whole quasi-solid-state electrolyte was adjusted.

I. Production of Quasi-Solid-State Electrolyte

The PS/H$_2$O solution is centrifuged with a rotation rate of 4000 r/h for 6 hours, and the top clear solution is poured out. The precipitation sample is dried at 90° C. for one night to obtain the ordered PS template. The above PS template is immersed into a cobalt nitrate/methanol solution with a concentration of 0.05 g/mL for 2 hours. Then the solution is removed, and the PS template is dried at 90° C. for one night. The above sample is immersed into a 2-methylimidazole/methanol solution with a concentration of 0.1 g/mL for 48 hours to obtain PS/ZIF-67 composite. It is immersed into DMF and stirred for 24 hours to remove PS and get the 3DOM-ZIF-67. 4.5 mg of 3DOM-ZIF-67 and 3.5 mg of PEO are weighted. 0.95 mg of LiPF$_6$ and 0.95 mg of LiBOB are weighed. The four samples are stirred well and then formed into a film using a preforming machine.

II. Electrochemical Characterization of the Quasi-Solid-State Electrolyte

The ion conductivity was tested at different temperatures.

III. Production of Li—S all-Solid-State Battery

The electrolyte was then immersed in a 70% S/CS$_2$ solution at 155° C. for 6 h to obtain carbonaceous fabrics, which were mixed with carbon black (wt. 10%) and PVDF (10%) as the cathode material. A Li—S battery was assembled with lithium (Li) metal and commercially available Celgard 2500 separator. The battery performance was then tested at room temperature.

IV. Production of Li-Ion all-Solid-State Battery

A Li-ion battery is assembled with commercially available Nickel Cobalt Manganese (NCM523) as the ternary cathode material, and graphite as the negative electrode. While the obtained all-solid-state material is used as the electrolyte. The cell is assembled and tested under open air conditions.

Example 3

In Example 3, the ratio of MOFs in the whole quasi-solid-state electrolyte was adjusted.

I. Production of Quasi-Solid-State Electrolyte

The PS/H$_2$O solution is centrifuged with a rotation rate of 4000 r/h for 6 hours, and the top clear solution is poured out. The precipitation sample is dried at 90° C. for one night to obtain the ordered PS template. The above PS template is immersed into a cobalt nitrate/methanol solution with a concentration of 0.05 g/mL for 2 hours. Then the solution is removed and the PS template is dried at 90° C. for one night. The above sample is immersed into a 2-methylimidazole/methanol solution with a concentration of 0.1 g/mL for 48 hours to obtain a PS/ZIF-67 composite. It is immersed into DMF and stirred for 24 hours to remove PS and get the 3DOM-ZIF-67. 3DOM-ZIF-8 is obtained with similar procedures. 4 mg of 3DOM-ZIF-67, 2 mg of 3DOM-ZIF-8, and 2 mg of PEO are weighed. 0.75 mg of LiPF$_6$ and 0.75 mg of LiBOB are weighed. The above samples are stirred well and then formed into a film using a preforming machine.

II. Electrochemical Characterization of the Quasi-Solid-State Electrolyte

The ion conductivity was tested at different temperatures.

III. Production of Li—S all-Solid-State Battery

The electrolyte was then immersed in a 70% S/CS$_2$ solution at 155° C. for 6 h to obtain carbonaceous fabrics, which were mixed with carbon black (wt. 10%) and PVDF (10%) as the cathode material. A Li—S battery was assembled with lithium (Li) metal and commercially available Celgard 2500 separator. The battery performance was then tested at room temperature.

IV. Production of Li-Ion all-Solid-State Battery

A Li-ion battery is assembly with commercially available Nickel Cobalt Manganese (NCM523) as the ternary cathode material, and graphite as the negative electrode. The obtained all-solid-state material is used as the electrolyte. The cell is assembled and tested under open air conditions.

Comparative Example 1

The quasi-solid-state electrolyte is produced in the same manner as in Example 1 except that the 3DOM-MOFs used in Example 1 were not used for the Li—S battery.

Comparative Example 2

The quasi-solid-state electrolyte is produced in the same manner as in Example 1 except that the 3DOM-MOFs used in Example 1 were not used for Li-ion battery.

Comparative Example 3

The CR2032 coin cells were assembled by using sulfur composite (S and Li$_2$S, 1:1 by mole) electrodes as the cathode, Celgard 2500 membrane as the separator, and lithium foil as the anode in an Ar-filled glove box with moisture and oxygen levels lower than 0.5 ppm. The electrolyte contains 1M lithium bis(trifluoromethane) sulfonamide (LiTFSI) in a binary solvent of dimethoxymethane/1,3-dioxolane (DME/DOL, 1:1 by volume) with 2 wt. % LiNO$_3$ as an additive.

FIG. 1 shows that the 3DOM-ZIF-67-PEO-LiPF$_6$/LiBOB quasi-solid-state electrolyte of the present invention was successfully obtained.

Figure 2:
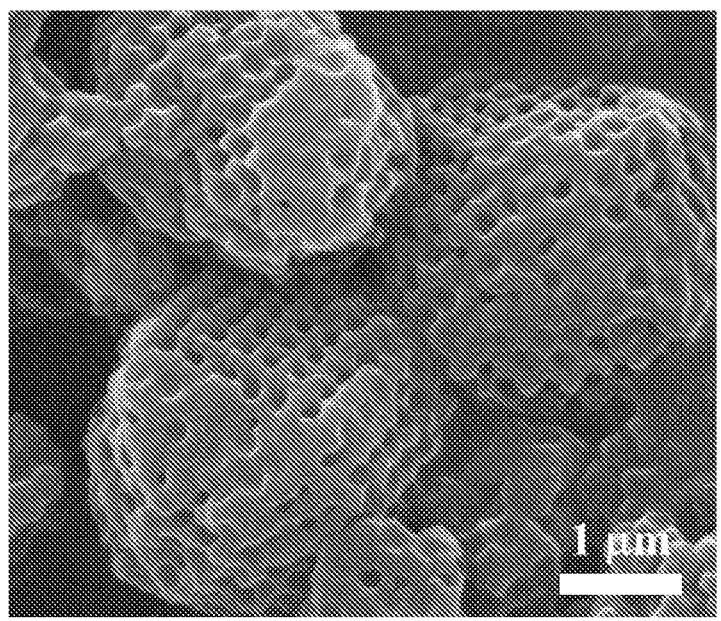
FIG. 2 is the SEM image of 3DOM-ZIF-67-PEO-LiPF$_6$/LiBOB quasi-solid-state electrolyte with higher magnification according to Example 1.

FIG. 2 shows that the pores of the 3DOM-ZIF-67-PEO-LiPF$_6$/LiBOB quasi-solid-state electrolyte of the present invention are ordered and the particle size is not so uniform.

Figure 3:
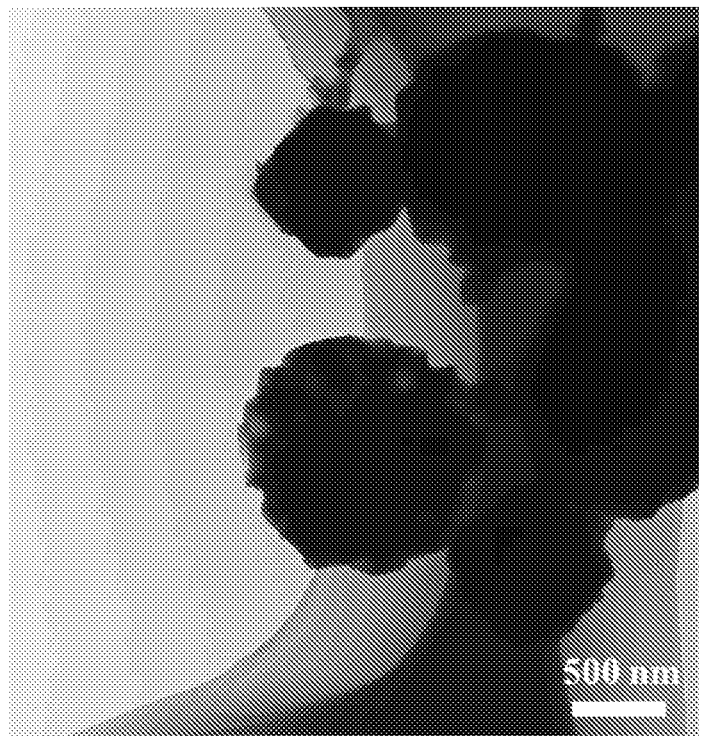
FIG. 3 is the TEM image of 3DOM-ZIF-67-PEO-LiPF$_6$/LiBOB quasi-solid-state electrolyte, according to Example 2.

The TEM image in FIG. 3 confirms the existence of pores in the 3DOM-ZIF-67-PEO-LiPF$_6$/LiBOB. Some pores are blocked with the PEO, thus it is not so clear to see.

Figure 4:
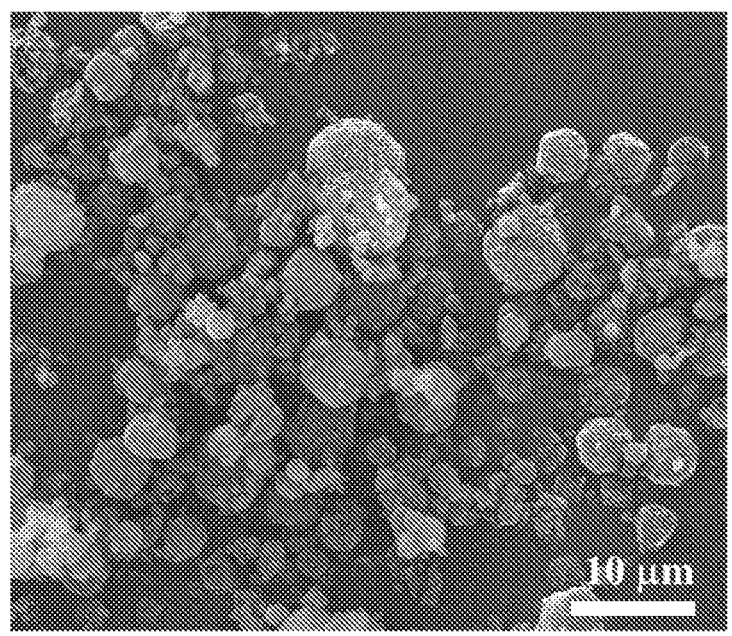
FIG. 4 is the SEM image of 3DOM-ZIF-67/3DOM-ZIF-8-PEO-LiPF$_6$/LiBOB quasi-solid-state electrolyte with higher magnification, according to Example 3.

FIG. 4 shows that the 3DOM-ZIF-67/3DOM-ZIF-8-PEO-LiPF$_6$/LiBOB quasi-solid-state electrolyte of the present invention was successfully obtained.

Figure 5:
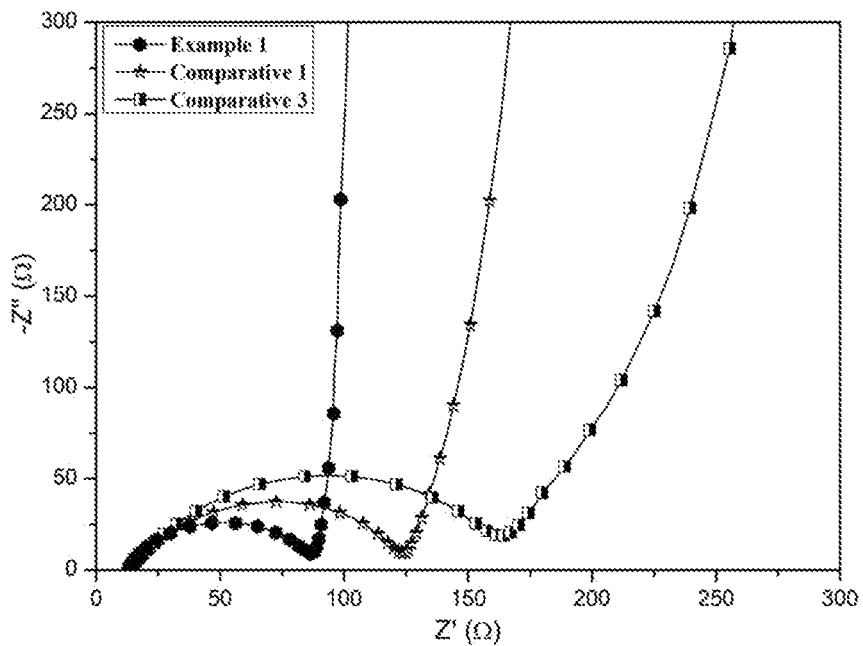
FIG. 5 is the EIS results of quasi-solid-state electrolyte resistance, according to Example 1 and Comparative Examples 1 and 3.

FIG. 5 shows that the quasi-solid-state electrolyte resistance in Example 1 and Comparative Examples 1 and 3 was 87Ω, 125Ω, and 162Ω, respectively, indicating that the existence of 3DOM-MOFs particles is beneficial for reducing the resistance and improving the Li$^+$ ion conductivity as the PEO crystallinity degree could be lowered by the 3DOM-MOFs.

Figure 6:
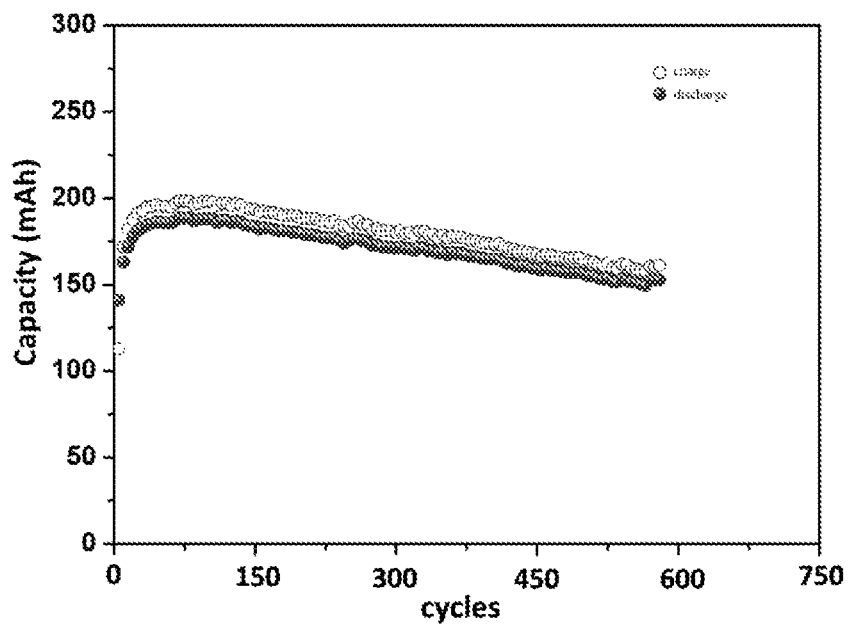
FIG. 6 is the charge-discharge performance of the quasi-solid-state Li-ion battery, according to Example 1.

FIG. 6 shows that the charge-discharge performance of the quasi-solid-state Li-ion battery in Example 1 still reaches 151 mAh, even after 600 cycles. It should be noted that the nominal capacity of batteries is 200 mAh. The profile is CC 0.5 C to 2.8 V, 0.05 C for charging, and CC 0.5 C to 1.5 V for discharging.

The invention claimed is:

1. A quasi-solid-state electrolyte composition for a secondary Li battery comprising: (a) three-dimensionally ordered macroporous metal-organic framework materials (3DOM-MOFs) including macropores and micropores; (b) a polymer electrolyte compounded into at least one of the macropores; (c) a liquid organic electrolyte compounded into at least one of the micropores; and (d) a lithium salt.

2. The quasi-solid-state electrolyte composition of claim 1, wherein the weight percentages of the 3DOM-MOFs relative to the total weight of the quasi-solid state electrolyte composition are in a range of 10%-70%, the weight percentages of the polymer electrolyte relative to the total weight of the quasi-solid state electrolyte composition are in a range of 5%-20%, the weight percentages of the liquid organic electrolyte are relative to the total weight of the quasi-solid state electrolyte composition in a range of 0.01%-0.1%, and the weight percentages of the said lithium salt relative to the total weight of the quasi-solid state electrolyte composition are in a range of 5%-19.9%.

3. The quasi-solid-state electrolyte composition of claim 1, wherein the 3DOM-MOFs is selected from at least one of 3DOM-PCN-601, 3DOM-ZIF-8, 3DOM-ZIF-67, 3DOM-ZIF-68, 3DOM-ZIF-69, 3DOM-ZIF-70, 3DOM-ZIF-78, 3DOM-ZIF-81, 3DOM-ZIF-82, 3DOM-ZIF-95, 3DOM-ZIF-100, [{Fe$_3$($\mu_3$—O)(bdc)$_3$}$_4${Co$_2$(na)$_4$(LT)$_2$}$_3$] and JUC-1000.

4. The quasi-solid-state electrolyte composition of claim 1, wherein the polymer electrolyte is selected from at least one of Polyethylene oxide (PEO), polymethyl methacrylate (PMMA), polyacrylonitrile (PAN), polyvinylidene difluoride (PVDF), polyvinylidene fluoride-hexafluoropropylene (PVDF-HFP) and derivatives thereof.

5. The quasi-solid-state electrolyte composition of claim 1, wherein the liquid organic electrolyte is selected from at least one of tetraethylene glycol dimethyl ether (TEGDME), 1,2-Dimethoxyethane (DME), Diethylene glycol dimethyl ether (DG), tetraglyme (TG), 1,3-dioxolane (DOL), Tetrahydrofuran (THF), and ethyl methanesulfonate (EMS).

6. The quasi-solid-state electrolyte composition of claim 1, wherein the lithium salt is selected from at least one of LiPF$_6$, LiBF$_4$, LiClO$_4$, LiAsF$_6$, LiBOB, LiODFB, LiCF$_3$SO3, and LiN(SO$_2$CF$_3$)$_2$.

7. The quasi-solid-state electrolyte composition of claim 1, wherein the 3DOM-MOFs comprise at least two types of 3DOM-MOF.

8. The quasi-solid-state electrolyte composition of claim 1, wherein a weight percentage of the 3DOM-MOFs relative to the total weight of the quasi-solid state electrolyte composition ranges from 1.5% to 50%.

9. The quasi-solid-state electrolyte composition of claim 1, wherein the polymer electrolyte comprises PEO or a mixture of PEO and another polymer.

10. The quasi-solid-state electrolyte composition of claim 1, wherein a weight percentage of the polymer electrolyte relative to the total weight of the quasi-solid state electrolyte composition ranges from 5% to 10%.

11. The quasi-solid-state electrolyte composition of claim 1, wherein the liquid organic electrolyte comprises at least two types of liquid organic electrolyte.

12. The quasi-solid-state electrolyte composition of claim 1, wherein a weight percentage of the liquid organic electrolyte relative to the total weight of the quasi-solid state electrolyte composition ranges from 0.02% to 0.1%.

13. The quasi-solid-state electrolyte composition of claim 1, wherein the lithium salt comprises at least two types of lithium salt.

14. The quasi-solid-state electrolyte composition of claim 1, wherein a weight percentage of the lithium salt relative to the total weight of the quasi-solid state electrolyte composition ranges from 5% to 15%.

* * * * *